(12) United States Patent
Harda

(10) Patent No.: US 9,566,983 B2
(45) Date of Patent: Feb. 14, 2017

(54) CONTROL ARRANGEMENT ARRANGED TO CONTROL AN AUTONOMOUS VEHICLE, AUTONOMOUS DRIVE ARRANGEMENT, VEHICLE AND METHOD

(71) Applicant: VOLVO CAR CORPORATION, Gothenburg (SE)

(72) Inventor: Peter Harda, Torslanda (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 14/930,988

(22) Filed: Nov. 3, 2015

(65) Prior Publication Data

US 2016/0129908 A1 May 12, 2016

(30) Foreign Application Priority Data

Nov. 10, 2014 (EP) .................................. 14192491

(51) Int. Cl.
*B60W 30/14* (2006.01)
*G05D 1/00* (2006.01)

(52) U.S. Cl.
CPC .......... *B60W 30/143* (2013.01); *B60W 30/146* (2013.01); *G05D 1/0088* (2013.01); *B60W 2550/22* (2013.01); *B60W 2550/408* (2013.01)

(58) Field of Classification Search
CPC .............. B60W 30/143; B60W 30/146; B60W 2550/408; B60W 2550/22; G05D 1/0088
See application file for complete search history.

(56) References Cited

U.S. PATENT DOCUMENTS

| 7,616,781 B2 * | 11/2009 | Schofield | G06K 9/00818 |
| | | | 382/104 |
| 8,064,643 B2 * | 11/2011 | Stein | G06K 9/00818 |
| | | | 382/103 |
| 8,831,813 B1 | 9/2014 | Ferguson et al. | |

(Continued)

FOREIGN PATENT DOCUMENTS

| DE | 102008047771 | 4/2010 |
| DE | 102011082375 | 3/2013 |

(Continued)

OTHER PUBLICATIONS

Extended European Search Report for European Application No. EP 14192491.0, Completed by the European Patent Office, Dated May 11, 2015, 5 Pages.

*Primary Examiner* — Michael J Zanelli
(74) *Attorney, Agent, or Firm* — Brooks Kushman P.C.

(57) ABSTRACT

A vehicle, method, control arrangement, and autonomous drive arrangement are provided. The control arrangement is for controlling an autonomous drive arrangement in a host vehicle including an autonomous drive arrangement configured to control steering and velocity of the host vehicle up to an autonomous drive maximum velocity of the host vehicle, a speed limit determination unit, and a communication unit arranged to receive, from at least one external source, real time preceding vehicle velocity for one or more preceding vehicles. The control arrangement is configured to control the autonomous drive arrangement in dependence on a difference between the autonomous drive maximum velocity and at least one of a speed limit and at least one preceding vehicle velocity.

14 Claims, 5 Drawing Sheets

(56) References Cited

U.S. PATENT DOCUMENTS

2010/0204896 A1* 8/2010 Biondo ............... B60W 30/143
 701/93
2012/0083959 A1 4/2012 Dolgov et al.

FOREIGN PATENT DOCUMENTS

| | | |
|---|---|---|
| DE | 102013003215 | 9/2013 |
| JP | H0785400 | 3/1995 |
| WO | WO 02/098695 A1 * | 12/2002 |

* cited by examiner

CONTROL ARRANGEMENT ARRANGED TO CONTROL AN AUTONOMOUS VEHICLE, AUTONOMOUS DRIVE ARRANGEMENT, VEHICLE AND METHOD

CROSS-REFERENCE TO RELATED APPLICATIONS

This application claims foreign priority benefits under 35 U.S.C. §119(a)-(d) to European patent application number EP 14192491.0, filed Nov. 10, 2014, which is incorporated by reference in its entirety.

TECHNICAL FIELD

Embodiments herein relate to a control arrangement for an autonomous host vehicle drive arrangement. Embodiments herein further relate to an autonomous drive arrangement and an autonomous vehicle. Embodiments herein further relate a method for controlling an autonomous drive arrangement.

BACKGROUND

Some vehicles today are capable of driving autonomously, i.e. without steering—accelerating—or braking input from a driver. Sensors of the autonomous vehicle continuously monitor the vehicle surrounding. The sensors can detect e.g. road lanes, surrounding traffic and various obstacles on—or in the vicinity of the road. The sensors may detect distance and direction to other vehicles, pedestrians, bicycles etc. Different kinds of sensors may be used, such as cameras, radar and/or lidar. Autonomous vehicles may also comprise communication equipment, such that road and/or traffic information may be sent to the vehicle. A drive arrangement of the vehicle may control drive functions, such as steering, accelerating, braking etc. as a function of the information received from the sensors. Hereby the vehicle can drive autonomously at least along some road sections within a road network.

Some requirements must be met before autonomous driving is possible to initiate. For example, autonomous driving may be enabled only when the sensors provide the drive arrangement with sufficient information on the host vehicle surrounding. Different geographical limitations on where autonomous driving is possible may apply. Further, due to various limitations of sensors of the drive arrangement and/or host vehicle functions, autonomous driving may be activated only in certain velocity intervals. For example, autonomous driving of a host vehicle may be possible only between an autonomous drive minimum velocity and an autonomous drive maximum velocity.

Autonomous drive functions may facilitate for a driver, since he/she may focus on secondary tasks instead of driving when autonomous driving is enabled. However, due to limitations of the autonomous drive arrangement or limitations of autonomous host vehicle functions, the driver may select to drive manually instead of using autonomous drive functions which do not provide autonomous driving in line with the driver's preferences.

Thus, improvements related to autonomous driving and enablement of autonomous drive functions are desirable.

SUMMARY

Embodiments herein aim to provide a control arrangement, arranged to control an autonomous host vehicle drive arrangement in a host vehicle, eliminating or at least reducing the problems and/or drawbacks associated with prior art solutions.

According to an embodiment, this is provided by a control arrangement, arranged to control an autonomous host vehicle drive arrangement in a host vehicle comprising;

the autonomous drive arrangement which is arranged to control steering and velocity of the host vehicle up to an autonomous drive maximum velocity of the host vehicle, at least partly based on information received from host vehicle sensors, a speed limit determination unit, arranged to determine speed limits for a route along which the host vehicle travels, a communication unit arranged to receive, from at least one external source, real time preceding vehicle velocity for one or more preceding vehicles, wherein the control arrangement is arranged to control the autonomous drive arrangement in dependence of a difference between the autonomous drive maximum velocity and at least one of;

a speed limit, received from the speed limit determination unit, at least one preceding vehicle velocity, received from the communication unit.

Since the control arrangement is arranged to control the autonomous drive arrangement in dependence of a difference between the autonomous drive maximum velocity and at least one of a speed limit, received from the speed limit determination unit and at least one preceding vehicle velocity, received from the communication unit, the control arrangement is arranged to enable the autonomous drive arrangement in situations where the autonomous drive arrangement otherwise would have been disabled. Hereby the amount of autonomous driving is increased compared to the amount of manual driving for the same route, all other things being equal. According to some embodiments the control arrangement is arranged to control the autonomous drive arrangement in dependence of both a speed limit and at least one preceding vehicle velocity.

Thus, hereby is provided a control arrangement, arranged to control an autonomous host vehicle drive arrangement in a host vehicle, eliminating or at least reducing the problems and/or drawbacks associated with prior art solutions.

According to some embodiments, the control arrangement is arranged to disable the autonomous drive arrangement if the speed limit exceeds the sum of the autonomous drive maximum velocity plus a threshold velocity, and enable the autonomous drive arrangement if the speed limit is equal to or less the autonomous drive maximum velocity plus the threshold velocity.

Since the control arrangement is arranged to disable the autonomous drive arrangement if the speed limit exceeds the sum of the autonomous drive maximum velocity plus a threshold velocity, the host vehicle may be driven manually when the host vehicle is incapable of driving autonomously at or near a speed limit velocity. The control arrangement is further arranged to enable the autonomous drive arrangement if the speed limit is equal to or less the autonomous drive maximum velocity plus the threshold velocity. Hereby the host vehicle is driven autonomously when the drive arrangement can control the host vehicle to drive with a velocity equal to or near the speed limit velocity. For example; with an autonomous drive maximum velocity of 100 km/h and a threshold velocity of 10 km/h, the control arrangement is arranged to disable the autonomous drive arrangement if the speed limit exceeds 110 km/h. If the speed limit is 110 km/h or below the control arrangement is arranged to enable the autonomous drive arrangement.

According to some embodiments, the control arrangement is arranged to enable the autonomous drive arrangement if the speed limit exceeds the sum of the autonomous drive maximum velocity and a threshold velocity and the at least one preceding vehicle velocity is equal to or less the autonomous driving maximum velocity.

Since the control arrangement is arranged to enable the autonomous drive arrangement if the speed limit exceeds the sum of the autonomous drive maximum velocity and a threshold velocity and the at least one preceding vehicle velocity is equal to or less the autonomous driving maximum velocity, autonomous driving is enabled and the host vehicle may follow the preceding vehicle at a velocity equal to or less the autonomous driving maximum velocity.

According to some embodiments, the communication unit is arranged to receive real time preceding vehicle velocities for a plurality of preceding vehicles and in that the control arrangement is arranged to control the autonomous drive arrangement in dependence of a difference between an autonomous drive maximum velocity and at least one of; the speed limit, received from the speed limit determination unit, a plurality of real time velocities for the plurality of preceding vehicles, received from the communication unit.

Since the control arrangement is arranged to control the autonomous drive arrangement in dependence of a difference between an autonomous drive maximum velocity and at least one of; the speed limit and a plurality of real time velocities for the plurality of preceding vehicles, both vehicle and safety is enhanced. For example; the autonomous drive maximum velocity is 100 km/h and autonomous driving is disabled since the speed limit is 120 km/h. If it is determined that preceding vehicles drives e.g. 70-80 km/h, the autonomous driving is enabled by the control arrangement such that the host vehicle can be controlled to follow the preceding vehicles at 70-80 km/h.

According to some embodiments, the communication unit is arranged to receive real time preceding vehicle velocities for a plurality of preceding vehicles and in that the control arrangement is arranged to control the autonomous drive arrangement in dependence of a difference between the autonomous drive maximum velocity and at least one of; the speed limit, received from the speed limit determination unit and a queue velocity for the plurality of preceding vehicles, received from the communication unit. Hereby the control arrangement can control the host vehicle to drive autonomously with approximately the queue velocity also when autonomous drive previously has been disabled due to the difference between the autonomous drive maximum velocity and a speed limit.

According to some embodiments, the control arrangement is arranged to disable the autonomous drive arrangement if the speed limit exceeds the sum of the autonomous drive maximum velocity plus a threshold velocity and enable the autonomous drive arrangement if the speed limit is equal to or less the autonomous drive maximum velocity plus the threshold velocity Since the control arrangement is arranged to disable the autonomous drive arrangement if the speed limit exceeds the sum of the autonomous drive maximum velocity plus a threshold velocity and enable the autonomous drive arrangement if the speed limit is equal to or less the autonomous drive maximum velocity plus the threshold velocity the host vehicle may be autonomously driven a maximum share of the time. In other words, the control arrangement controls the autonomous drive arrangement to be enabled in every situation where it is appropriate to drive autonomously. It is appropriate to drive autonomously only when the host vehicle may drive with a velocity which is sufficiently near a current speed limit. If the autonomous drive arrangement cannot drive at the speed limit velocity minus a threshold velocity, autonomous driving is disabled.

According to some embodiments the control arrangement is arranged to enable the autonomous drive arrangement if the speed limit exceeds the sum of the autonomous driving maximum velocity and a threshold velocity and the queue velocity for a plurality of preceding vehicles is equal to or less the autonomous driving maximum velocity. Hereby the control arrangement can control the host vehicle to drive autonomously with approximately the queue velocity also when autonomous drive otherwise would have been disabled due to the difference between the autonomous drive maximum velocity and a speed limit.

According to some embodiments the communication unit is arranged to receive, from at least one of roadside infrastructure, one or more preceding vehicles and one or more remote servers, real time preceding vehicle velocity for one or more preceding vehicles Since the communication unit is arranged to receive, from at least one of roadside infrastructure, one or more preceding vehicles, one or more remote servers, real time preceding vehicle velocity for one or more preceding vehicles, the real time preceding vehicle velocity information can be used for the control of the autonomous drive arrangement.

According to some embodiments the control arrangement is arranged to control the autonomous drive arrangement to; autonomously drive the host vehicle if the speed limit is equal to or less the autonomous driving maximum velocity plus a threshold velocity, switch from autonomous drive to manual or semi-manual drive if the speed limit exceeds the autonomous driving maximum velocity plus the threshold velocity and no queue of preceding vehicles is present within a threshold distance ahead of the host vehicle, autonomously drive the host vehicle if the speed limit exceeds the autonomous driving maximum velocity plus the threshold velocity and a queue of preceding vehicles is present within a threshold distance ahead of the host vehicle, and where a queue velocity is equal to or less the autonomous driving maximum velocity. Hereby a vehicle operator is much facilitated by the control arrangement, since it controls the host vehicle to drive autonomously when possible, i.e. when the host vehicle may drive sufficiently fast, and disables autonomous drive functions when the host vehicle would have been driven too slow autonomously. The host vehicle may drive sufficiently fast when the host vehicle may drive within the threshold velocity from the speed limit velocity, or at a velocity near the queue velocity.

Semi-manual drive refers to a situation where a user is required for the driving, but a subsystem such as cruise control or similar is activated.

According to some embodiments the control arrangement is arranged to provide, via the communication unit, the at least one external source with information indicative of at least one of; where and/or when the autonomous drive arrangement is enabled; where and/or when the autonomous drive arrangement is disabled and where and/or when a queue is present. Hereby the information may be collected, stored and/or used for different purposes. The information may e.g. be used as input to autonomous drive arrangements in other vehicles, or for decisions whether autonomous driving may be suitable and/or possible for certain road sections.

The control arrangement may also be referred to as a control arrangement for an autonomous vehicle drive arrangement and/or as a control arrangement for an autonomous vehicle.

Thus, hereby is provided a control arrangement, arranged to control an autonomous host vehicle drive arrangement in a host vehicle eliminating or at least reducing the problems and/or drawbacks described above.

Embodiments herein also aim to provide an autonomous drive arrangement without the problems or drawbacks described above.

According to some embodiments, this is provided by an autonomous drive arrangement according to embodiments disclosed herein.

Embodiments herein also aim to provide a vehicle comprising an autonomous drive arrangement without the problems or drawbacks described above.

According to some embodiments, this is provided by a vehicle comprising an autonomous drive arrangement according to embodiments disclosed herein.

Embodiments herein also aim to provide a method for controlling an autonomous drive arrangement in a host vehicle without the problems or drawbacks described above.

According to some embodiments, this is provided by a method for controlling an autonomous drive arrangement in a host vehicle comprising;

the autonomous drive arrangement which is arranged to control steering and velocity of the host vehicle up to an autonomous driving maximum velocity, at least partly based on information received from host vehicle sensors, a speed limit determination unit, arranged to determine speed limits for a route along which the host vehicle travels, a communication unit arranged to receive, from at least one external source, real time preceding vehicle velocity for one or more preceding vehicles, wherein in that the method comprises controlling the autonomous drive arrangement in dependence of a difference between an autonomous drive maximum velocity and at least one of; the speed limit, received from the speed limit determination unit and at least one preceding vehicle velocity, received from the communication unit.

Since the method comprises controlling the autonomous drive arrangement in dependence of a difference between an autonomous drive maximum velocity and at least one of; the speed limit, received from the speed limit determination unit and at least one preceding vehicle velocity, received from the communication unit, autonomous driving can be performed in situations where the autonomous drive arrangement otherwise would have been disabled. Hereby the amount of autonomous driving is increased compared to the amount of manual driving for the same route, all other things being equal.

According to some embodiments, this is provided by a method comprising;

autonomously driving the host vehicle if the speed limit is equal to or less the autonomous drive maximum velocity plus a threshold velocity, switching from autonomous drive to manual or semi-manual drive if the speed limit exceeds the autonomous drive maximum velocity plus the threshold velocity and no queue of preceding vehicles is present within a threshold distance ahead of the host vehicle, autonomously driving the host vehicle if the speed limit exceeds the autonomous drive maximum velocity plus the threshold velocity and a queue of preceding vehicles is present within a threshold distance ahead of the host vehicle, and where a queue velocity is equal to or less the autonomous driving maximum velocity.

Hereby a vehicle operator is much facilitated by the control arrangement, since it controls the host vehicle to drive autonomously when it is possible. In other words, the host vehicle may be autonomously driven a maximum share of the time. The control arrangement controls the autonomous drive arrangement to be enabled in every situation where it is appropriate to drive autonomously. It is appropriate to drive autonomously only when the host vehicle may drive with a velocity which is sufficiently near a current speed limit. If the autonomous drive arrangement cannot drive at the speed limit velocity minus a threshold velocity, autonomous driving is disabled.

BRIEF DESCRIPTION OF THE DRAWINGS

The various aspects of embodiments herein, including particular features and advantages, will be readily understood from the following detailed description and the accompanying drawings, in which.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

Embodiments herein will now be described more fully with reference to the accompanying drawings, in which some embodiments are shown. However, this application should not be construed as limited to the embodiments set forth herein. Disclosed features of example embodiments may be combined as readily understood by one of ordinary skill in the art to which this application belongs. Like numbers refer to like elements throughout.

Well-known functions or constructions will not necessarily be described in detail for brevity and/or clarity.

Figure 1:
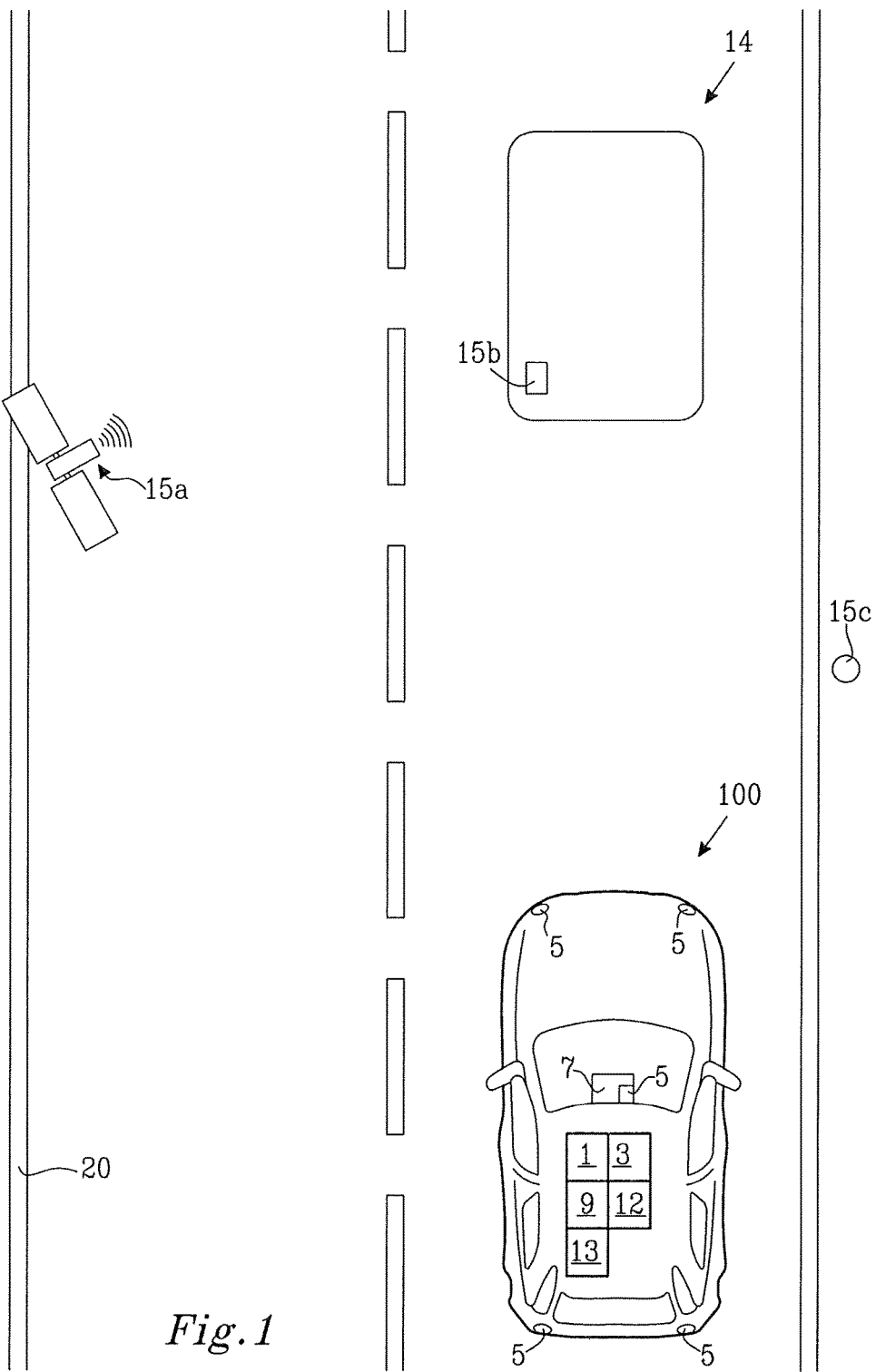
FIG. 1 illustrates a control arrangement, an autonomous drive arrangement and a vehicle according to some embodiments.

FIG. 1 illustrates a host vehicle 100. The host vehicle 100 comprises a control arrangement 1, an autonomous drive arrangement 3, sensors 5, a speed limit determination unit 7 and a communication unit 9. The host vehicle is also referred to as an autonomous vehicle.

The control arrangement 1 is connected to, and arranged to control, the autonomous drive arrangement 3. The control arrangement 1 may comprise or be connected to one or more processors or processing units, further described below. The control arrangement is further connected to the speed limit determination unit 7 and the communication unit 9.

The autonomous drive arrangement 3 allows the host vehicle 100 to be driven autonomously along a route or a road. The autonomous drive arrangement 3 normally comprises an electrical/mechanical control arrangement, arranged to control steering and velocity of the host vehicle 100 at least partly based on information received from the sensors 5. The autonomous drive arrangement 3 is connected to a vehicle steering system, such that the autonomous drive arrangement, directly or indirectly, can control a direction of at least some of the wheels of the host vehicle 100. Hereby e.g. a yaw rate of the host vehicle 100 can be adjusted, such that the driving direction of the host vehicle 100 is adjusted in accordance with the input from the autonomous drive arrangement 3. The autonomous drive arrangement 3 is also connected to a host vehicle engine and a host vehicle braking system, such that the autonomous drive arrangement 3, directly or indirectly, can control acceleration and/or deceleration of the host vehicle 100. The autonomous drive arrangement 3 can e.g. increase a host vehicle velocity by increasing the engine speed, and decrease the host vehicle velocity by motor-braking or by activation of one or more wheel brakes. The autonomous drive arrangement 3 may e.g. be connected to an ABS (anti-lock braking system), such that one or more wheel brakes can be activated selectively.

In some embodiments the autonomous drive arrangement 3 comprises, or is connected to, a number of vehicle subsystems. Each such subsystem may provide some automatic- or semi-automatic drive functions but cannot autonomously control the host vehicle 100 from a first destination to a second destination without input from a driver. Examples of such subsystem are: adaptive cruise control systems, lane departure control systems, collision avoidance systems, traffic sign recognition systems, some communication systems, some navigation systems, ultrasonic sensor systems, infrared camera systems, inertial measuring systems, intelligent transportation systems, safe road train systems, automatic parking systems etc.

The sensor or sensors 5 can be one or more camera sensors, one or more radar sensors and/or one or more lidar-sensors. The at least one sensor 5 can be arranged at any position in/on the host vehicle 100 from where detection of a vehicle surrounding is possible. Sensors 5 may for example be arranged at a vehicle front-, side and/or rear portion, at a vehicle grille, bumpers, rear-view-mirrors and/or a windshield. Some sensors 5 may be arranged in or near a vehicle compartment, chassis, motor, drivetrain and/or wheels. The sensor position may depend on the type of sensor used. For example, a camera sensor may be arranged at an inside of a windshield, while one or more radar sensors and/or a lidar sensor may be arranged in the grille and/or bumpers.

A camera sensor may be e.g. a front-, side- or rear facing digital camera equipped with or connected to one or more processors with object recognition logics. Hereby surrounding objects, such as road lanes, other vehicles, traffic signs, pedestrians, animals, different obstacles etc. may be detected and in some cases, identified/classified. Radar sensors include transmitters that emit signals that bounce back from objects around the host vehicle, and receivers that receive the returned signals. The radar sensors may include e.g. ultra wide band radars, narrow band radars and/or multi node radars. Lidar-sensors may measure distances to objects through illuminating the objects with a laser and analyzing the reflected light. Other types of sensors 5 used to monitor the vehicle surrounding may be e.g. ultrasonic sensors and/or infrared sensors.

As illustrated in FIG. 1, the host vehicle 100 comprises a communication unit 9. The communication unit 9 may comprise a receiver that receives signals from at least one external source, such as surrounding vehicles, and converts them to information, such as real time information relating to preceding vehicle 14 velocity, acceleration, braking, lane selection, statuses, heading etc. The receiver may also be configured to communicate with external sources in form of infrastructure such as remote servers/the cloud, databases, and/or roadside units. The communication unit 9 may also comprise a transmitter which converts real time host vehicle information, e.g. relating to host vehicle velocity, acceleration, braking, lane selection, statuses, heading etc. into a signal, such as an electrical signal and/or a signal carried by electromagnetic waves. Hereby host vehicle 100 information may be distributed to other vehicles and/or infrastructure such as remote servers/the cloud, databases, and/or roadside units.

Any suitable means may be used for the communication between the host vehicle 100 and other vehicles or infrastructure, e.g. radio signals, such as according to either of standards, such as the GSM, 3G, LTE and/or WiFi standards, and/or satellite communication signals.

At least one of the autonomous drive arrangement 3 and the control arrangement 1 comprises or is connected to at least one processing unit 12. The processing unit 12 may comprise one or more processors arranged to receive, via the communication unit 9, from at least one external source 15, real time traffic information on one or more preceding vehicles 14. The one or more processing units 12 may comprise, or be connected to, one or more memory units having stored computer executable instructions, and may perform the various operations and/or functions described herein.

In some embodiments at least some database information on preceding vehicles 14 may be stored temporarily in one or more memory units in the host vehicle 100. In some embodiments the one or more processing units 12 are used for processing in several different vehicle systems. Some processing units 12 may be dedicated to a specific processing task. In some embodiments the host vehicle 100 and/or the control arrangement 1 may comprise a large number of processing units 12. The one or more processing units 12 may be central processing units that carries out instructions of computer programs/software which when executed perform basic arithmetical, logical, and input/output operations. The control arrangement 1 and/or the autonomous drive arrangement 3 may also comprise an accelerated processing unit, APU, also referred to as an advanced processing unit. An APU is a processing unit that includes additional processing capability designed to accelerate one or more types of computations outside of a CPU. One or more processing units 12 may comprise application programming interfaces, APIs, which specify how software components may interact with each other.

In some embodiments the control arrangement 1 is connected to a navigation system 13 comprised in the host vehicle 100, to which a user can input a preferred host vehicle route. The navigation system 13 can comprise a positioning arrangement, which may determine a host vehicle position and heading. The positioning system can determine the host vehicle position and driving direction e.g. via a satellite based global positioning system or via map matching and a compass.

The control arrangement 1 in the host vehicle 100 is arranged to receive real time traffic information on one or more preceding vehicles 14 from at least one external source 15a, 15b, 15c. In the FIG. 2 illustration, the at least one external source 15 may be one or more remote server 15a. Such server/servers may also be referred to as the cloud. The at least one external source 15 may be communication equipment 15*b* within or attached to one or more preceding vehicles 15 or roadside units/roadside infrastructure 15*c*. The roadside units/roadside infrastructure 15*c* may be e.g. toll-stations, roadside cameras, various vehicle counting arrangements, roadside communication equipment and other infrastructure with purpose of collecting or sharing traffic information for a road section or area.

Figure 2A:
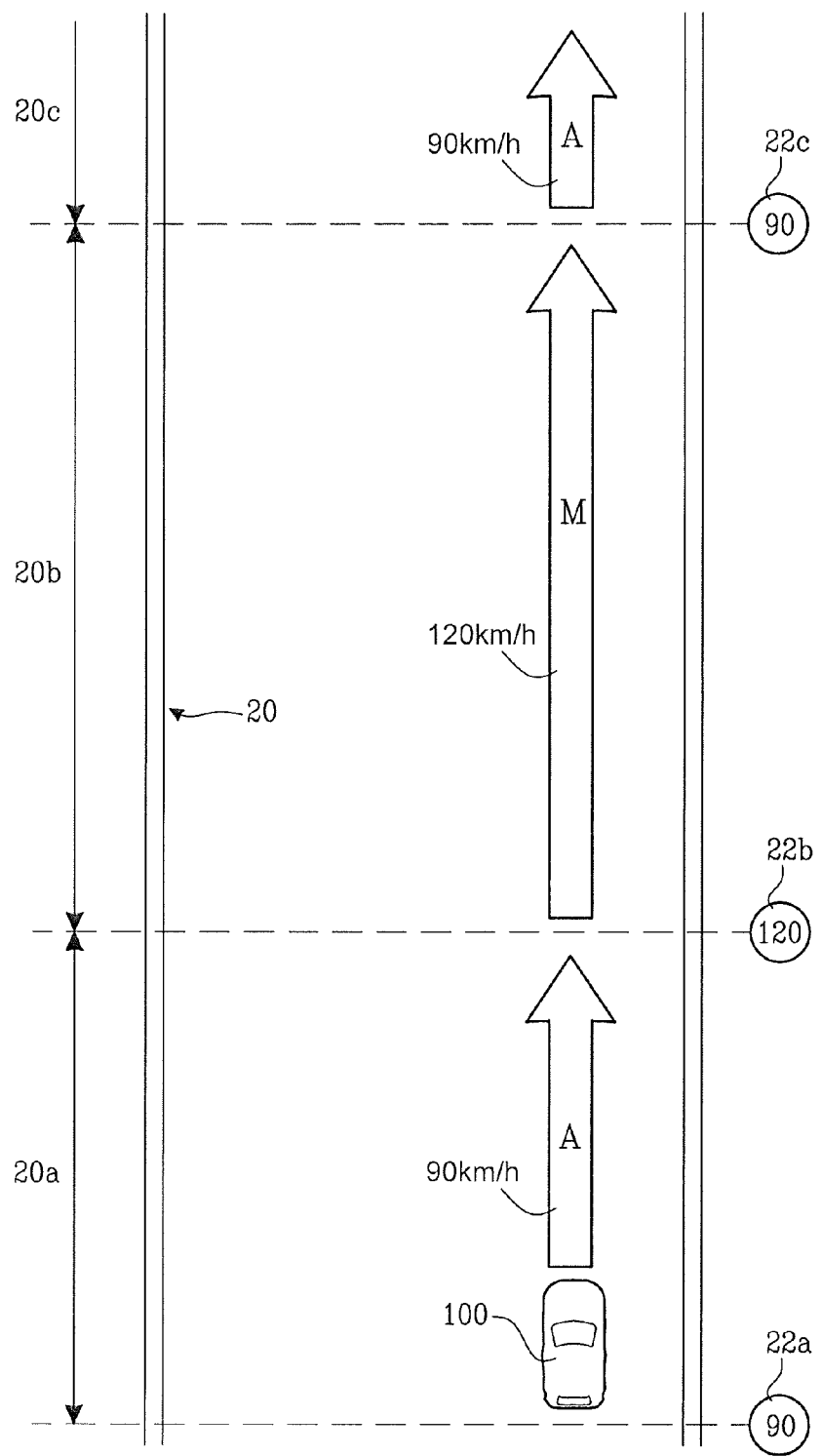
FIG. 2a illustrates the vehicle according to some embodiments in a first traffic scenario.

FIG. 2*a* illustrates the host vehicle 100 and the control arrangement 1 in a road environment. The host vehicle 2 is driving on a road 20. The road 20 has different speed limits for different sections 20*a*, 20*b*, and 20*c* along the road 20. If a speed limit for a section is e.g. 90 km/h, vehicles are allowed to drive at a maximum speed of 90 km/h along the section. In FIG. 2*a* speed limit signs 22 are illustrated. The purpose with such speed limit signs 22 is to provide information on the allowed speed after the speed limit sign 22. If the road 20 has lanes in different directions, speed limit signs 22 may be arranged to provide information on speed limits in both directions. The speed limit signs 22 may be arranged at different sides of the road 20. Different lanes in the same direction may have different speed limits. In FIG. 2*a* speed limit signs are arranged in the vicinity of the road 20. Speed limits may also be communicated to vehicles along the road, e.g. via radio signals or other types of signals. Information on speed limits for different road sections may be stored in a digital map or similar. The information may be stored in a memory unit within the host vehicle 100 or sent to the host vehicle 100 from an external source such as a remote server 15*a* or roadside infrastructure 15*c*. The speed limit determination unit 7, which may comprise a processor and memory storing computer executable instructions for performing one or more of the operations or functions described herein, may use such information to determine speed limits.

A section for which the host vehicle is driven autonomously is indicated with an A-arrow and a section for which the host vehicle is driven manually is indicated with an M-arrow in the figures.

In the scenario depicted in FIG. 2*a* the host vehicle 100 is driven autonomously along section 20*a*. In the illustrated scenario the host vehicle 100 has passed a first speed limit sign 22*a*, indicative of an allowed speed of 90 km/h.

When the host vehicle 100 continues along the road 20 the host vehicle 100 will pass the second speed limit sign 22*b* and continue along the section 20*b*. In this scenario the allowed speed limit for section 20*b* is 120 km/h. If an autonomous drive maximum velocity of the host vehicle is at least 120 km/h the host vehicle may continue to drive autonomously along section 22*b*.

The autonomous drive maximum velocity of the host vehicle 100 is the maximum velocity the host vehicle 100 can drive autonomously, i.e. without manual input from a driver. This autonomous drive maximum velocity may be limited, e.g. for technical reasons. When a speed limit for a route along which the host vehicle 100 travels exceeds the autonomous drive maximum velocity, the host vehicle 100 is unable to drive with a velocity equivalent to the speed limit and/or is unable to keep up with a traffic flow. Autonomous driving may then be disabled, automatically or manually. A driver may then instead follow the speed limit and/or traffic flow.

In the scenario depicted in FIG. 2*a* the autonomous drive maximum velocity of the host vehicle is 100 km/h. The host vehicle is therefore unable to keep the allowed speed, i.e. to drive autonomously at a velocity of 120 km/h. If the vehicle operator would like to continue at 120 km/h he/she may continue to drive manually along the section 20*b*. If the vehicle operator would like the host vehicle to continue to drive autonomously it may do so, but only up to the autonomous drive maximum velocity of 100 km/h. In FIG. 2*a*, the host vehicle is driven manually along section 20*b*, as indicated by the M-arrow.

When the host vehicle 100 continues along the road 20 the host vehicle 100 will pass the third speed limit sign 22*c* and continue along section 20*c*. In this scenario the allowed speed limit for section 20*c* is 90 km/h. The host vehicle 100 may therefore drive autonomously along section 22*c*.

In one embodiment the control arrangement is arranged to disable the autonomous drive arrangement if the speed limit exceeds the sum of the autonomous drive maximum velocity plus a threshold velocity. The threshold velocity may be a selected velocity such as in the range of 0-25 km/h. Thus, the threshold velocity may be e.g. 0, 5, 10, 15, or 20 km/h. In some embodiments the threshold velocity is more than 25 km/h. In some embodiments the threshold velocity may vary in accordance with a current velocity of the host vehicle 100. The threshold velocity may e.g. be 0-25% of a current host vehicle velocity, such as 0, 5, 10, 15 or 20% of the current host vehicle velocity. In some embodiments the threshold velocity may vary in dependence of a speed limit for a road section.

In the scenario illustrated in FIG. 2*a* the threshold velocity is 7 km/h. Thus, if the speed limit is above the autonomous drive maximum velocity of 100 km/h plus the threshold velocity of 7 km/h, i.e. 107 km/h, the control arrangement is arranged to disable the autonomous drive arrangement. Since the speed limit for section 20*b* is 120 km/h, autonomous driving is disabled.

In one embodiment the control arrangement is arranged to enable the autonomous drive arrangement if the speed limit is equal to or less than the autonomous drive maximum velocity plus the threshold velocity. In the above example autonomous driving is enabled if the speed limit is 107 km/h or below.

Figure 2B:
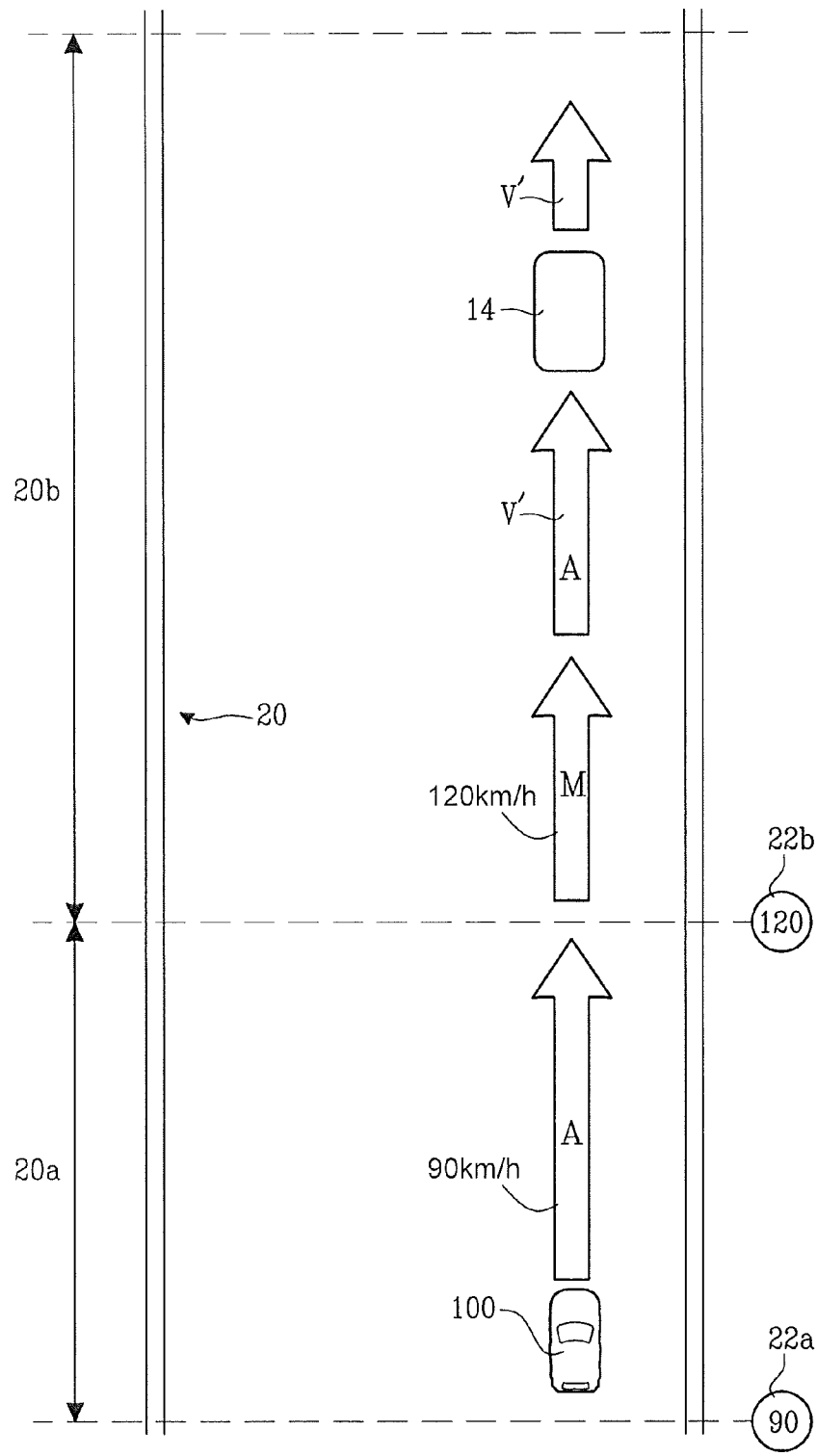
FIG. 2b illustrates the vehicle according to some embodiments in a second traffic scenario.

In FIG. 2*b* the host vehicle 100 is illustrated in a scenario with at least one preceding vehicle 14. The preceding vehicle 14 is travelling at a velocity v'. The velocity v' may be referred to as real time velocity for the preceding vehicle 14. The control arrangement in the host vehicle 100 is arranged to receive the real time preceding vehicle velocity from the preceding vehicle 14 or from an external source, such as a remote server or any type of roadside infrastructure. The real time preceding vehicle velocity v' is received via the communication unit 9 of the host vehicle 100 whereby this information may be received also without visual contact between the vehicles. In some embodiments the real time preceding vehicle velocity v' is detected by a sensor of the host vehicle 100, such as a radar sensor, a lidar sensor and/or a camera sensor.

In the FIG. 2*b* scenario the velocity of the host vehicle 100 exceeds the velocity v' of the preceding vehicle 14, and the distance between the two vehicles therefore decreases.

In this scenario the control arrangement in the host vehicle 100 is arranged to enable the autonomous drive arrangement if the speed limit exceeds the sum of the autonomous drive maximum velocity and a threshold velocity and the at least one preceding vehicle velocity v' is equal to or less the autonomous driving maximum velocity.

With the same speed limits and velocities as in the FIG. 2*a* scenario, autonomous driving is enabled if the preceding vehicle 14 is travelling at 100 km/h or below. Thus, the host vehicle 100 will be autonomously driven albeit the speed limit is 120 km/h for section 20*b*. Autonomous driving can be activated e.g. if the host vehicle 100 is driving in the same lane as the preceding vehicle 14 and/or when a distance between the vehicles is below a threshold distance.

Another example: If the autonomous drive maximum velocity is 115 km/h and the threshold velocity is 10 km/h, the control arrangement is arranged to disable the autonomous drive arrangement if the speed limit exceeds 125 km/h. If it is determined that the preceding vehicle 14 drives 30 km/h although the speed limit is 130 km/h, e.g. due to a temporary queue, accident, or similar, the control arrangement is arranged to enable the autonomous drive arrangement. The host vehicle 100 may for example follow the preceding vehicle 14 at approximately the speed of the preceding vehicle 14. In other words, if it is determined that one or several preceding vehicles 14 drives slower than the speed limit, the host vehicle 100 is driven autonomously "as fast as possible" after the one or more preceding vehicles 14.

In some embodiments autonomous driving is enabled automatically when necessary conditions for autonomous driving are fulfilled. In some other embodiment a driver may confirm enabling/disabling of autonomous driving via any kind of user interface, such as via a touch screen, button or voice command. In some embodiments autonomous driving is enabled automatically if a driver does not actively deselects autonomous driving.

In some embodiments the control arrangement is arranged to enable the autonomous drive arrangement if the speed limit exceeds the sum of the autonomous drive maximum velocity and a threshold velocity and the at least one preceding vehicle 14 velocity is equal to or less the autonomous driving maximum velocity only when the host vehicle 100 cannot overtake the preceding vehicle 14. This situation may occur if the road 20 is too narrow or winding for an overtake. This situation may also occur e.g. if one, two or more preceding vehicles 14 obstruct the road 20 such that an overtake is difficult and/or impossible.

Figure 2C:
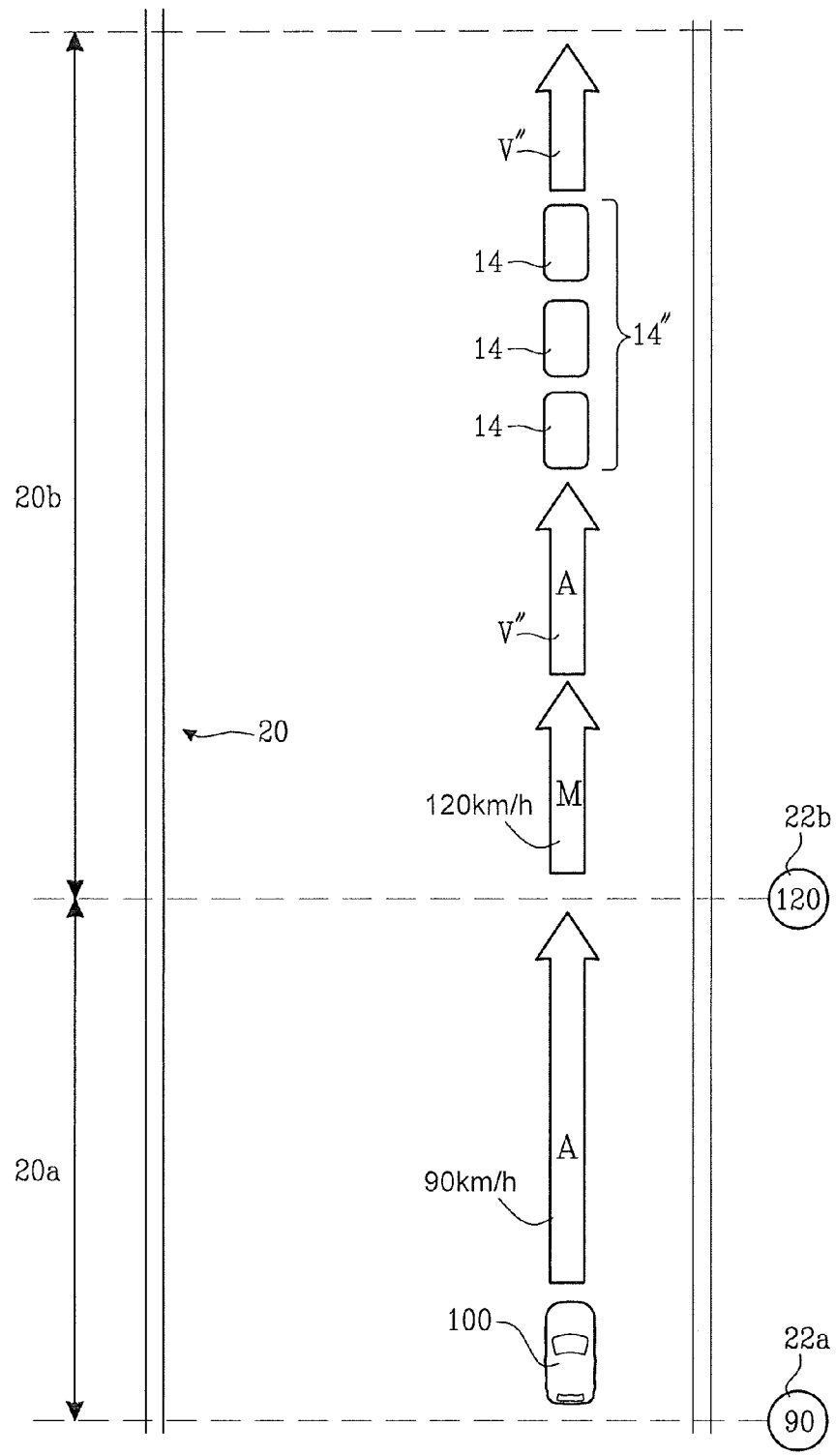
FIG. 2c illustrates the vehicle according to some embodiments in a third traffic scenario.

In FIG. 2c the host vehicle 100 is illustrated in a scenario with a plurality of preceding vehicles 14. The preceding vehicles 14 are travelling at a preceding vehicle velocity v". The preceding vehicle velocity v" may be referred to as a queue velocity for the preceding vehicles 14. The control arrangement in the host vehicle 100 is arranged to receive the queue velocity v" from the preceding vehicles 14 or from an external source, such as a remote server or any type of roadside infrastructure.

The queue velocity v" may be seen as a common velocity or a traffic flow velocity for the plurality of vehicles 14.

The plurality of preceding vehicles can form a group 14" of vehicles. The group 14" may be defined e.g. as every vehicle within a particular area. A group may be formed also if a distance between adjacent vehicles 14 is below a predetermined maximum distance. The group of vehicles may be dynamic, i.e. the number of vehicles 14 in the group may increase or decrease along a route. The extension of the group may be defined by the distance between adjacent vehicles 14. For example, the group may be formed by a number of preceding vehicles where the distance between every pair of adjacent vehicles are less than 200 meters, 150 meters, 100 meters, 50 meters, 25 meters, 10 meters or 5 meters.

If the velocity of each preceding vehicles within the group is within a predetermined range, such as 5 km/h or 10 km/h, the velocity forms the queue velocity v".

According to some embodiments the communication unit 9 in the host vehicle 100 is arranged to receive real time preceding vehicle velocities for the plurality of preceding vehicles 14. The control arrangement is arranged to control the autonomous drive arrangement in dependence of a difference between the autonomous drive maximum velocity and a plurality of real time velocities for the plurality of preceding vehicles 14 or a queue velocity v" for the plurality of preceding vehicles 14. In some embodiment the control arrangement is arranged to control the autonomous drive arrangement in dependence of a difference between the autonomous drive maximum velocity and a speed limit for the section along which the vehicle drives.

According to some embodiments the control arrangement is arranged to enable the autonomous drive arrangement only if the queue velocity v" is equal to or less the autonomous driving maximum velocity for at least a predetermined time and/or distance. Hereby the host vehicle is able to drive autonomously with at least the queue velocity v" along a predetermined time distance or for a predetermined amount of time, even if the queue velocity v" momentarily exceeds the autonomous drive maximum velocity. In other words, the queue velocity may v" vary somewhat, but over time the host vehicle is able to drive with the queue velocity v" such that the traffic flow is not delayed by host vehicle.

The queue velocity v" along a predetermined time distance or for a predetermined amount of time may be referred to as a mean queue velocity. In some embodiments the control arrangement is arranged to control the autonomous drive arrangement in dependence of a difference between the autonomous drive maximum velocity and the mean queue velocity.

Figure 3:
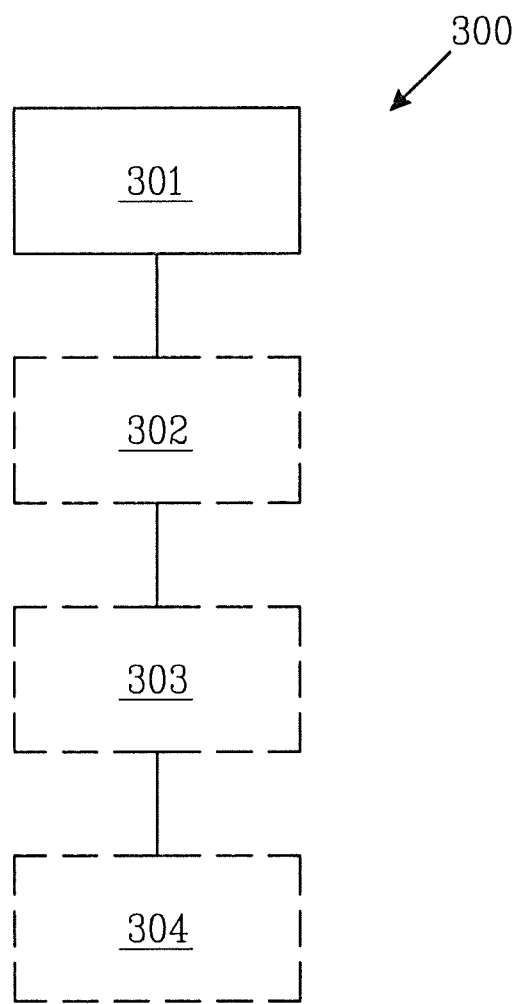
FIG. 3 illustrates a method for controlling an autonomous drive arrangement.

FIG. 3 illustrates a method 300 for controlling an autonomous drive arrangement in a host vehicle comprising;

the autonomous drive arrangement which is arranged to control steering and velocity of the host vehicle up to an autonomous driving maximum velocity, at least partly based on information received from host vehicle sensors, a speed limit determination unit, arranged to determine speed limits for a route along which the host vehicle travels, a communication unit arranged to receive, from at least one external source, real time preceding vehicle velocity for one or more preceding vehicles, The method 300 comprises:

controlling 301 the autonomous drive arrangement in dependence of a difference between an autonomous drive maximum velocity and at least one of the speed limit, received from the speed limit determination unit, and at least one preceding vehicle velocity, received from the communication unit.

According to some embodiments the method 300 further comprises:

autonomously driving 302 the host vehicle if the speed limit is equal to or less the autonomous drive maximum velocity plus a threshold velocity, switching 303 from autonomous drive to manual or semi-manual drive if the speed limit exceeds the autonomous drive maximum velocity plus the threshold velocity and no queue of preceding vehicles is present within a threshold distance ahead of the host vehicle, autonomously driving 304 the host vehicle if the speed limit exceeds the autonomous drive maximum velocity plus the threshold velocity and a queue of preceding vehicles is present within a threshold distance ahead of the host vehicle, and where a queue velocity is equal to or less the autonomous driving maximum velocity.

Thus, the autonomous driving maximum velocity for autonomous vehicles 100 can be limited for technical reasons. Therefore it is not possible for autonomous vehicles 100 to keep up with traffic flow on roads 20 where the speed limit is higher than the autonomous driving maximum velocity. By utilizing e.g. cloud based data on traffic flow, from preceding vehicles 14 and/or any type of road side measurement, it is possible to identify road sections where preceding vehicle velocities are temporarily below the speed limit. This scenario may be caused e.g. where there are queues on the road 20. During those sections autonomous driving is enabled such that the host vehicle 100 can drive autonomously in congested areas and/or along a route section. When the queue dissolves, the host vehicle 100 detects that it is driving slower than the surrounding traffic. Autonomous driving is then disabled and the driver take control over the host vehicle 100. The host vehicle 100 can further upload information on the traffic situation to the cloud.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A control arrangement for controlling an autonomous drive arrangement in a host vehicle, the host vehicle including an autonomous drive arrangement configured to control steering and velocity of the host vehicle up to an autonomous drive maximum velocity of the host vehicle, at least partly based on information received from host vehicle sensors, a speed limit determination unit configured to determine speed limits for a route along which the host vehicle travels, and a communication unit configured to receive, from at least one external source, real time preceding vehicle velocity for one or more preceding vehicles, the control arrangement comprising:
one or more processing units configured to control the autonomous drive arrangement in dependence on a difference between the autonomous drive maximum velocity and at least one of i) a speed limit received from the speed limit determination unit, and ii) at least one preceding vehicle velocity received from the communication unit.

2. The control arrangement according to claim 1 wherein the control arrangement is configured to:
disable the autonomous drive arrangement if the speed limit exceeds the sum of the autonomous drive maximum velocity plus a threshold velocity; and
enable the autonomous drive arrangement if the speed limit is equal to or less the autonomous drive maximum velocity plus the threshold velocity.

3. The control arrangement according to claim 1 wherein the control arrangement is configured to enable the autonomous drive arrangement if the speed limit exceeds the sum of the autonomous drive maximum velocity and a threshold velocity and the at least one preceding vehicle velocity is equal to or less the autonomous driving maximum velocity.

4. The control arrangement according to claim 1 wherein the communication unit is configured to receive real time preceding vehicle velocity for a plurality of preceding vehicles and the control arrangement is configured to control the autonomous drive arrangement in dependence on a difference between an autonomous drive maximum velocity and at least one of i) the speed limit received from the speed limit determination unit, and ii) a plurality of real time velocities for the plurality of preceding vehicles received from the communication unit.

5. The control arrangement according to claim 1 wherein the communication unit is configured to receive real time preceding vehicle velocities for a plurality of preceding vehicles and the control arrangement is configured to control the autonomous drive arrangement in dependence on a difference between the autonomous drive maximum velocity and at least one of i) the speed limit, received from the speed limit determination unit, and ii) a queue velocity for the plurality of preceding vehicles received from the communication unit.

6. The control arrangement according to claim 5 wherein the control arrangement is configured to:
disable the autonomous drive arrangement if the speed limit exceeds the sum of the autonomous drive maximum velocity plus a threshold velocity; and
enable the autonomous drive arrangement if the speed limit is equal to or less the autonomous drive maximum velocity plus the threshold velocity.

7. The control arrangement according to claim 5 wherein the control arrangement is configured to enable the autonomous drive arrangement if the speed limit exceeds the sum of the autonomous driving maximum velocity and a threshold velocity and the queue velocity for a plurality of preceding vehicles is equal to or less the autonomous driving maximum velocity.

8. The control arrangement according to claim 1 wherein the communication unit is configured to receive, from at least one of roadside infrastructure, one or more preceding vehicles, and one or more remote servers, real time preceding vehicle velocity for one or more preceding vehicles.

9. The control arrangement according to claim 1 wherein the control arrangement is configured to control the autonomous drive arrangement to:
autonomously drive the host vehicle if the speed limit is equal to or less the autonomous driving maximum velocity plus a threshold velocity;
switch from autonomous drive to manual or semi-manual drive if the speed limit exceeds the autonomous driving maximum velocity plus the threshold velocity and no queue of preceding vehicles is present within a threshold distance ahead of the host vehicle; and
autonomously drive the host vehicle if the speed limit exceeds the autonomous driving maximum velocity plus the threshold velocity and a queue of preceding vehicles is present within a threshold distance ahead of the host vehicle, and where a queue velocity is equal to or less the autonomous driving maximum velocity.

10. The control arrangement according to claim 9 wherein the control arrangement is configured to provide, via the communication unit, the at least one external source with information indicative of at least one of where and/or when the autonomous drive arrangement is enabled, where and/or when the autonomous drive arrangement is disabled, and where and/or when a queue is present.

11. An autonomous drive arrangement comprising a speed limit determination unit, a communication unit and a control arrangement according to claim 1.

12. An autonomous vehicle comprising an autonomous drive arrangement according to claim 11.

13. A method for controlling an autonomous drive arrangement in a host vehicle, the host vehicle including an autonomous drive arrangement configured to control steering and velocity of the host vehicle up to an autonomous driving maximum velocity, at least partly based on information received from host vehicle sensors, a speed limit determination unit configured to determine speed limits for a route along which the host vehicle travels, and a communication unit configured to receive, from at least one external source, real time preceding vehicle velocity for one or more preceding vehicles, the method comprising:
controlling the autonomous drive arrangement in dependence of a difference between an autonomous drive maximum velocity and at least one of i) the speed limit received from the speed limit determination unit, and ii) at least one preceding vehicle velocity received from the communication unit.

14. The method according to claim 13 further comprising:
autonomously driving the host vehicle if the speed limit is equal to or less the autonomous drive maximum velocity plus a threshold velocity;
switching from autonomous drive to manual or semi-manual drive if the speed limit exceeds the autonomous drive maximum velocity plus the threshold velocity and no queue of preceding vehicles is present within a threshold distance ahead of the host vehicle; and
autonomously driving the host vehicle if the speed limit exceeds the autonomous drive maximum velocity plus the threshold velocity and a queue of preceding vehicles is present within a threshold distance ahead of the host vehicle, and where a queue velocity is equal to or less the autonomous driving maximum velocity.

* * * * *